United States Patent
Raj et al.

(10) Patent No.: US 11,830,070 B2
(45) Date of Patent: Nov. 28, 2023

(54) SUSTAINABLE RESOURCES EXCHANGE METHOD AND SYSTEM

(71) Applicant: Accenture Global Solutions Limited, Dublin (IE)

(72) Inventors: Sahil Raj, Babhniyawan (IN); Mithilesh Kumar, New Delhi (IN); Saumya Tiwari, Etawah (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/411,785

(22) Filed: Aug. 25, 2021

(65) Prior Publication Data

US 2023/0067755 A1    Mar. 2, 2023

(51) Int. Cl.
| | |
|---|---|
| *G06Q 40/00* | (2023.01) |
| *G06Q 40/04* | (2012.01) |
| *G06Q 30/0283* | (2023.01) |
| *G06Q 30/0201* | (2023.01) |
| *G06F 18/28* | (2023.01) |

(52) U.S. Cl.
CPC ............ *G06Q 40/04* (2013.01); *G06F 18/28* (2023.01); *G06Q 30/0201* (2013.01); *G06Q 30/0283* (2013.01)

(58) Field of Classification Search
CPC ............... G06Q 40/04; G06Q 30/0201; G06Q 30/0283; G06K 9/6255
See application file for complete search history.

(56) References Cited

U.S. PATENT DOCUMENTS

| | | | |
|---|---|---|---|
| 5,059,403 A | | 10/1991 | Chen |
| 2008/0228665 A1* | | 9/2008 | Gotthelf ................ G06Q 40/06 |
| | | | 705/37 |
| 2009/0150298 A1* | | 6/2009 | Furman ................ G06Q 50/188 |
| | | | 705/26.1 |
| 2010/0312601 A1* | | 12/2010 | Lin ......................... G06Q 10/08 |
| | | | 705/308 |
| 2015/0093309 A1* | | 4/2015 | Ghosh ....................... C01D 7/18 |
| | | | 423/187 |
| 2018/0268379 A1* | | 9/2018 | Collins .............. G06Q 10/0635 |

OTHER PUBLICATIONS

"Waste-Outlet", founded 2016; https://www.sustainary.org/waste-outlet/.
"RecycleBlu", https://www.recycleblu.com/how-it-works.
"Recytrader" ; https://recytrader.com/.
"YRKL—Waste2Resource Marketplace" ; https://www.cyrkl.com/en/.
"Excel industrial group" ; https://www.eigus.com/services/chemical-trading/.

\* cited by examiner

*Primary Examiner* — Rajesh Khattar
(74) *Attorney, Agent, or Firm* — Plumsea Law Group, LLC

(57) ABSTRACT

A system to facilitate the exchange and re-use of industrial waste and byproduct materials that have a reuse possibility is disclosed. The system promotes recycling, reusing, and reclaiming of wastes sustainably to ensure compliance and waste minimization. In one embodiment, the system supports an intelligent service for generating recommendations across an industrial stock exchange. Companies looking to dispose of their wastes or byproducts can access the system to initiate and execute trade with other companies looking for materials or compounds that could be reused in their own manufacturing processes. Both parties will be guided toward their shared goal in order to provide a net-zero impact on the environment and maintain an ecological balance.

20 Claims, 11 Drawing Sheets

SUSTAINABLE RESOURCES EXCHANGE METHOD AND SYSTEM

TECHNICAL FIELD

The present disclosure generally relates to a system for facilitating the exchange of resources among companies. More specifically, the present disclosure generally relates to a computer-implemented system and method for the sustainable exchange and re-use of industrial waste and byproducts to ensure compliance and waste minimization.

BACKGROUND

Industrial waste produced by chemical companies is often a byproduct of a process meant to produce a particular product. This waste is mostly disposed of in landfills or incinerated, and only a small percentage is recycled or composted. When manufacturers try to recycle chemical byproducts, they usually either float tenders or use informal channels to trade off their industrial grade wastes or byproducts to a party in need. However, this process is not regularized. Thus, the large majority of industrial waste—which can be readily or with minimal processing re-used—goes unnoticed and its value is destroyed.

Chemicals management covers sourcing, transport, storage, use, production and management of occupational health and environmental risks throughout a material's life cycle. Successful outcomes in chemicals waste management ultimately require industry and regulators to develop workable policies, robust assessment methods and sound risk management measures. Unfortunately, due to the depletion of fossil fuels, the emerging effects of $CO_2$ emissions, and the rising demands for energy, there is a growing need for alternative waste management processes. Beyond industrial waste, there are also agricultural waste, biological waste, municipal sewage sludge (MSS), municipal solid waste (MSW), and shredder residue being produced. Due to the limited amount of space available for landfill use and the increasing costs of hazardous waste disposal, an alternative solution is needed. Although a number of waste management methods are currently employed, they are either impractical, generate further pollution, mainly cover only solid waste, are not regulated, or are too costly in terms of energy and economics. For example, existing methods fail to provide end-to-end services such as listing, search, purchase, intelligent process matching, etc. Matching a buyer and seller based on a chemical byproduct available by the seller and need of buyer is particularly difficult with chemical byproducts because the byproducts may need to go through further processing to produce the product needed by the seller. This means that it may not be immediately apparent that a buyer has a byproduct available that would be of value to a seller, making the buyer and seller a good match for an exchange. In addition, conventional marketplace portals generally allow only listing of the products, while the sales are executed through agreements which are conducted outside the portal. There is also a discouraging lack of transparency on inclusion of sustainability as a factor for product recommendations in current waste exchange paradigms.

There is a need in the art for a system and method that addresses the shortcomings discussed above.

SUMMARY

A system and method for identifying suppliers in a marketplace for the exchange of industrial byproducts that promotes compliance with sustainability goals and facilitates the implementation of a circular economy is disclosed. The system and method solve the problems discussed above by providing an intelligent system that is designed to bring together consumers and suppliers of waste products across industries. The system is designed to operate automatically with little human intervention during sale or purchase of the products. The automated architecture includes a recommendation engine for identifying suppliers that match a buyer's specifications and are aligned with minimum sustainable waste management practices. In particular, the disclosed system and method can match a seller of a byproduct with a buyer when it is not immediately obvious that the byproduct can be further processed to yield the product desired by the buyer.

In one aspect, the disclosure provides a method of identifying suppliers in a marketplace for the exchange of industrial byproducts. The method includes a first step of receiving, from a first consumer and at a cloud-based trading system, a search request for a first product, and a second step of mining data from a profile of the first consumer in order to obtain process capability data for the first consumer. A third step includes generating a process dictionary specific to the first customer based on the process capability data, the process dictionary including at least a first process, and a fourth step includes automatically identifying, at the trading system and with reference to the process dictionary, a first conversion option for the first product by which the first product can be obtained from a second product via the first process. The method further includes a fifth step of generating, via a recommendation engine of the trading system, a list including either or both of: direct suppliers offering the first product, or indirect suppliers offering the second product. In addition, the method includes a sixth step of displaying the list via a buyer dashboard for the trading system wherein the list indicates whether the supplier is a direct supplier or an indirect supplier, and the required process for converting the second product to the first product is indicated for indirect suppliers.

In another aspect, the disclosure provides a non-transitory computer-readable medium storing software comprising instructions executable by one or more computers which, upon such execution, cause the one or more computers to: (1) receive, from a first consumer and at a cloud-based trading system, a request for a first product; (2) mine data from a profile of the first consumer in order to obtain process capability data for the first consumer; (3) generate a process dictionary specific to the first customer based on the process capability data, the process dictionary including at least a first process; (4) automatically identify, at the trading system and with reference to the process dictionary, a first conversion option for the first product by which the first product can be obtained from a second product via the first process; (5) generate, via a recommendation engine of the trading system, a list including either or both of: direct suppliers offering the first product, or indirect suppliers offering the second product; and (6) display the list via a buyer dashboard for the trading system wherein the list indicates whether the supplier is a direct supplier or an indirect supplier, and the required process for converting the second product to the first product is indicated for indirect suppliers.

In another aspect, the disclosure provides a system for identifying suppliers in a marketplace for the exchange of industrial byproducts, the system comprising one or more computers and one or more storage devices storing instructions that are operable, when executed by the one or more computers, to cause the one or more computers to: (1)

receive, from a first consumer and at a cloud-based trading system, a request for a first product; (2) mine data from a profile of the first consumer in order to obtain process capability data for the first consumer; (3) generate a process dictionary specific to the first customer based on the process capability data, the process dictionary including at least a first process; (4) automatically identify, at the trading system and with reference to the process dictionary, a first conversion option for the first product by which the first product can be obtained from a second product via the first process; (5) generate, via a recommendation engine of the trading system, a list including either or both of: direct suppliers offering the first product, or indirect suppliers offering the second product; and (6) display the list via a buyer dashboard for the trading system wherein the list indicates whether the supplier is a direct supplier or an indirect supplier, and the required process for converting the second product to the first product is indicated for indirect suppliers.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
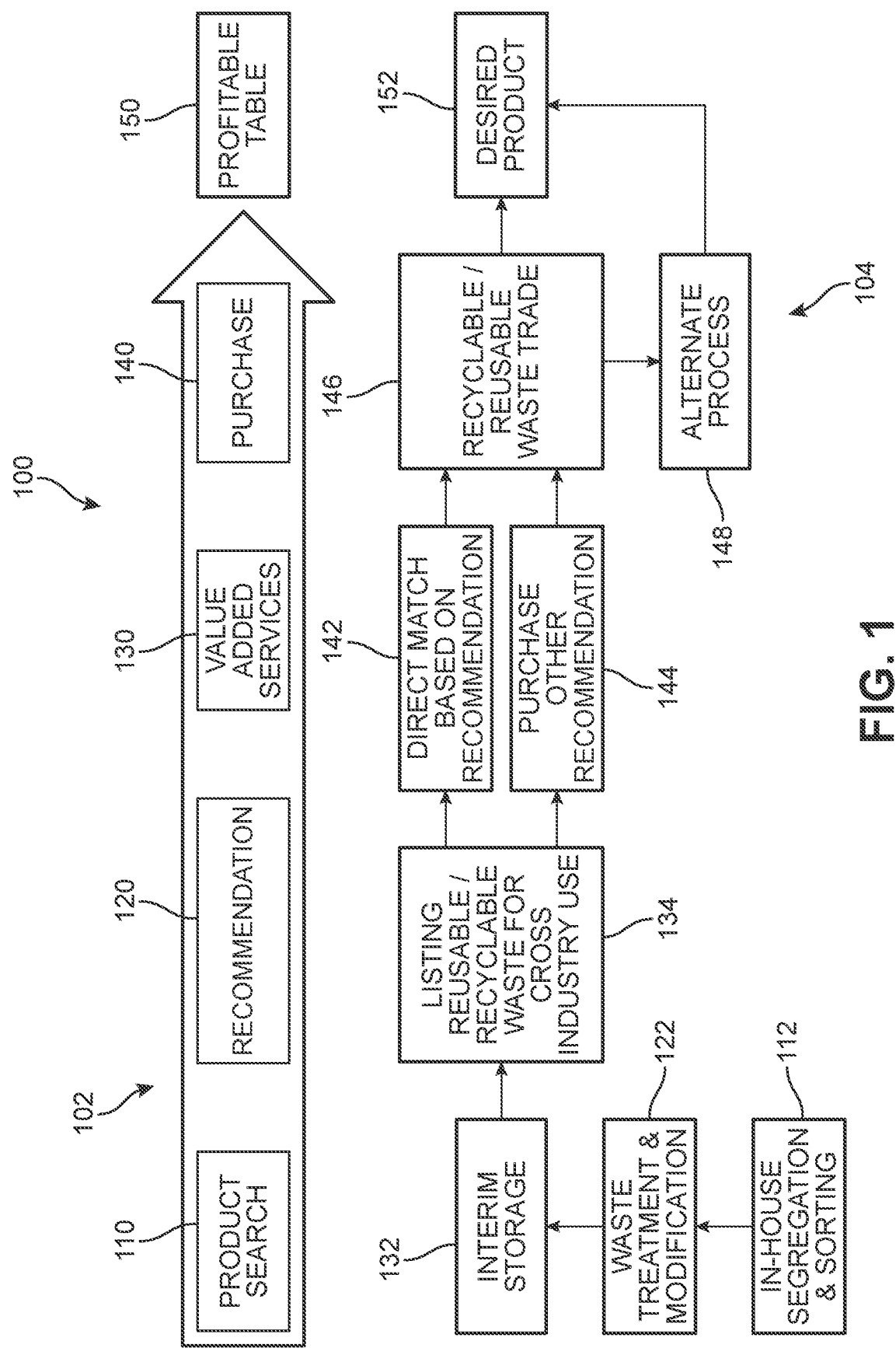
FIG. 1 is a schematic diagram of an embodiment of a byproduct marketplace system in an industrial environment.

The chemical industry as a whole has a significant impact on the environmental and economic condition of society. However, despite its importance, the state of the chemical industry has been fragmented with respect to waste treatment and disposal operations. Practices such as disposal of solid, liquid, or dry waste are siloed, increasing landfill volume as well as improper handling of hazardous waste. In many cases, these waste products could be recycled or re-processed for use by other industrial entities. There remains a lack of trading infrastructure or other marketplace for the responsible and sustainable exchange of waste. A system by which chemical or other companies can engage in waste trading to realize the value of reusable materials while fulfilling standards established by regulatory frameworks such as the United Nation's Sustainable Development Goals (SDGs) is crucial in order to protect environmental resources and reduce the occurrence of improper or otherwise undesirable waste disposal practices.

As will be described in greater detail below, the proposed embodiments disclose an ecosystem-based system to facilitate the exchange and re-use of industrial waste and byproduct materials that have a reuse possibility. The system promotes recycling, reusing, and reclaiming of wastes sustainably to ensure compliance and waste minimization. In one embodiment, the system supports an intelligent service for generating recommendations across an industrial stock exchange (RISE). Companies (producers or suppliers) looking to dispose of their wastes or byproducts can turn to the system to initiate and execute trade with companies (consumers) looking for materials or compounds that could be reused in their own manufacturing processes. As a general matter, a producer that generates a particular waste or byproduct can be matched to consumers with a particular manufacturing process that would enable the consumer to recover and recycle the waste to their own ends. Thus, both parties will be guided toward their shared goal in order to provide a net-zero impact on the environment and maintain an ecological balance.

The proposed embodiments implement a data-driven business-to-business system with an intelligent recommendation system that applies artificial intelligence (AI) and machine-learning (ML) engine to process data across the industrial materials value chain, analyzes critical exchange parameters and generates insights to facilitate trading. The system is configured to allow companies to buy or sell large volumes of industrial wastes and byproducts, having high circularity and re-usability value, rather than dumping or incinerating them. In some embodiments, proactive notifications based on the insights are generated, and buyers (consumers) and/or sellers (suppliers) can be alerted of the availability of and requirements for obtaining the compounds, allowing businesses to trade responsibly and avoid needless waste. In one example, the system offers separate onboarding processes and dashboards for buyers and sellers to ensure only relevant notifications are presented to each party. In addition, the system can foster robust collaboration between organizations and lead to the creation of special industrial hubs to promote and ease this collaboration. By leveraging a stacked classifier-based recommendation system and data describing consumers' existing process capabilities, the system can facilitate the propagation of a circular economy as users can maintain an ongoing record of their sustainability index and waste product status. Furthermore, use of the system can mitigate risks for companies, promote ethical waste handling, and offer a mutually beneficial ecosystem for the stakeholders as costs incurred in the procurement of new materials and waste disposal process are lowered. The system also encourages a reduced carbon footprint and lower scope 2 emissions and energy usage intensity in manufacturing and supply chains.

In different embodiments, the system is configured to receive data from buyers and sellers on their product, waste code, grade, quantity, processes, etc., and their data would then be categorized by leveraging the RCRA codes (Resource Conservation and Recovery Act) for standardization of waste material. A recommendation algorithm utilizes these parameters to generate insights on the best possible options of companies for trading of waste materials, in adherence with EPA waste disposal standards, promoting industrial symbiosis and collaboration.

Existing recommendation engines for online trade or commerce rely on user data and their interaction with products and services to dictate subsequent purchase decisions. These are mostly based on stable buying behaviors. Current players in chemical industry online marketplace focus primarily on listing their own products and waste materials. However, the marketplace does not provide enough information for targeted search with reference to sustainable fitment of listed products and sellers. Existing recommendation engines are thus not capable of providing recommendations based on intrinsic properties of chemicals and processes which can transform one chemical to another, particularly in an electronic commerce type marketplace. Such methods also lack considerations such as sustainability, and do not guide meaningful interaction on waste exchange within the chemical industry.

In contrast, the proposed embodiments are configured to apply a multi-feature approach covering sustainability parameters such as energy usage, carbon intensity, greenhouse gas emissions, and certifications which will be used to calculate sustainability index for the entity (e.g., green score) to label the data. Referring to FIG. 1, for purposes of introduction, an overview 100 of an implementation of the system in an industrial environment ("environment") is depicted. The overview 100 presents two flow sequences comprising a buyer flow 102 and a seller flow 104. The seller flow 104 begins at a first stage 112 where waste and byproducts are segregated and sorted in-house. In a second stage 122, the segregated products are treated and modified, and stored in a third stage 132. The seller can then list their products on the system in a fourth stage 134, for sale to buyers in the same industry, as well as to buyers in different industries (supporting a broader, cross-industry use of the waste).

Moving to the buyer flow 102, an industrial consumer may access the system and initiate a product search 110. In different embodiments, the system applies a decision-making algorithm (such as random forest) to identify a recommendation 120 for the buyer that intelligently incorporates parameters such as cost, distance, quantity, and alternate processes. This algorithm generates a matrix of company-chemical-conversion to ensure inclusion of all purchase options for the buyer, which can then be filtered based on buyer's existing processes and/or preferences, and/or offer other value-added services 130 that can be used to convert the product to a different product that aligns with the buyer's target compound or types of interim storage that are used to hold the product until delivery.

As will be discussed below, the system can be configured to identify and recommend either a direct match 142 for the buyer's desired compound from a designated seller, and/or recommend that the buyer purchase a different compound 144 from the seller that can be processed to serve the buyer's needs. The buyer can purchase 140 (or trade for) the compound from the seller in a fifth stage 146. Depending on the compound, the buyer can apply a processing technique 148 to produce the desired output or product 152 in a mutually profitable trade 150. In another example, the seller can—based on their own dictionary with a process that is available to the seller—offer to process the compound to the buyer's specifications in order to match the buyer's desired end-product. Some non-limiting examples of such catalyst-based techniques can include hydro-sulfurization, desulfurization, primary reforming, secondary reforming, high temperature shift converter, low temperature shift converter, methanation converter, and ammonia converter.

Thus, a streamlined process is made possible in which re-useable waste chemicals and other products can be presented to potential buyers, including products that might directly correspond to their target compound as well as products that can be transformed to the target compound via various processes. In different embodiments, a sustainability index-based classification of sellers through stacked classifiers is used to generate a list of suppliers matching a buyer's searched item. These suppliers are shortlisted using random forest techniques to optimize the search to direct matches and chemicals which can be processed to achieve the desired product based on the distance between the seller and buyer to ensure that energy emission is minimum. In one embodiment, a final filtering based on the buyer's process dictionary (i.e., processes or techniques that the buyer has access to), information which is provided by the buyer and remains confidential. The recommendations in the last step are matched to this dictionary and only those products aligning with the buyer's needs and facilities are recommended to buyers.

In different embodiments, the proposed system can be configured to facilitate the trade of compounds for both the buyer and the seller. For example, as a buyer logs into the dashboard for the system, they can select an option such as "Find a Reusable Match" to navigate to a page whereby the desired product name and quantity can be entered. The intelligent recommender system generates a recommendation which can be displayed on the buyer dashboard, for example in a table or list format and/or sent to the buyer as an automated notification. The buyer selects the listing that is best suited to his/her purposes, and places the order, which causes a notification to be sent to the seller who has listed the selected compound.

Figure 2:
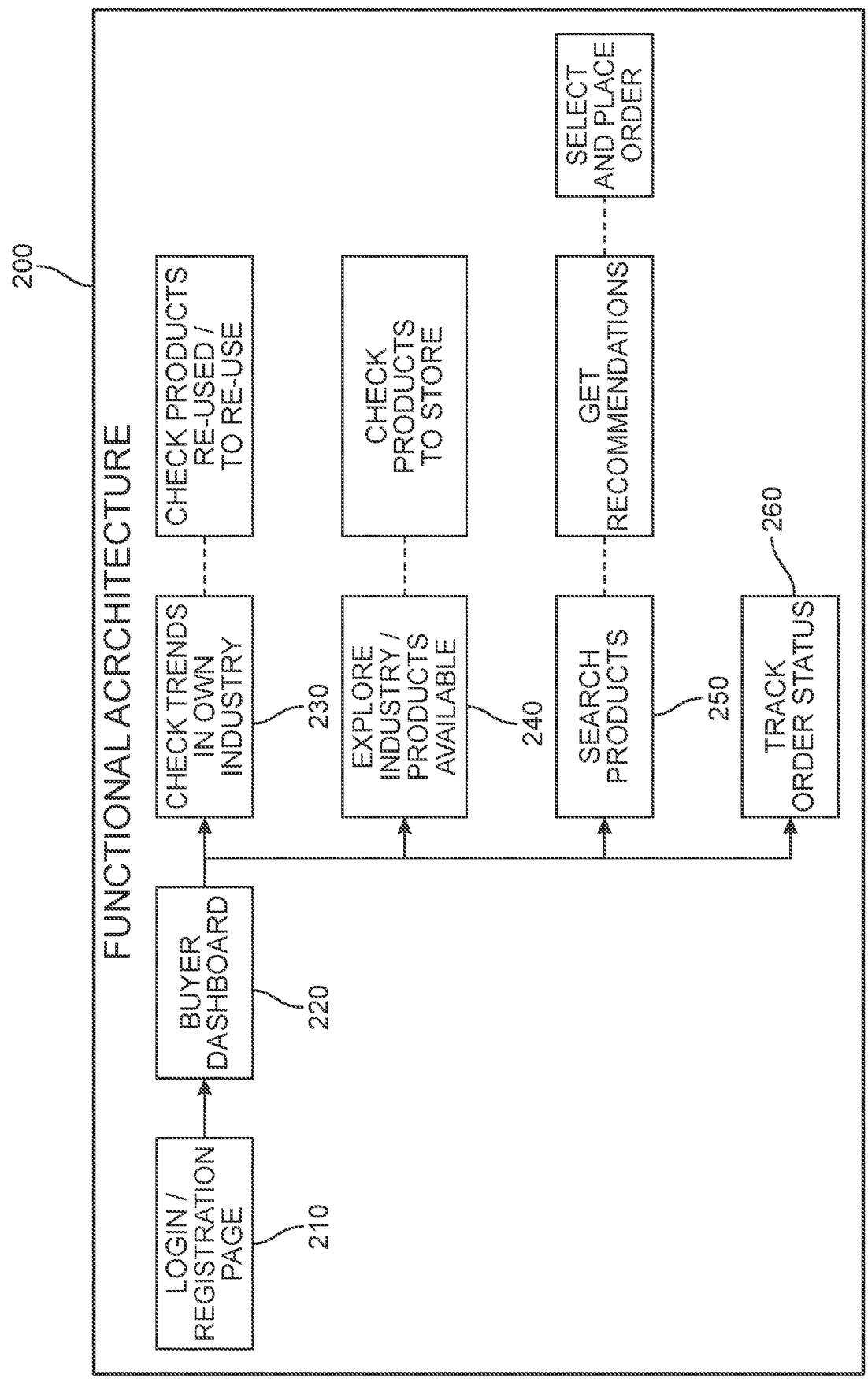
FIG. 2 is a schematic high-level flow diagram depicting an embodiment of a buyer interaction process.
Figure 3:
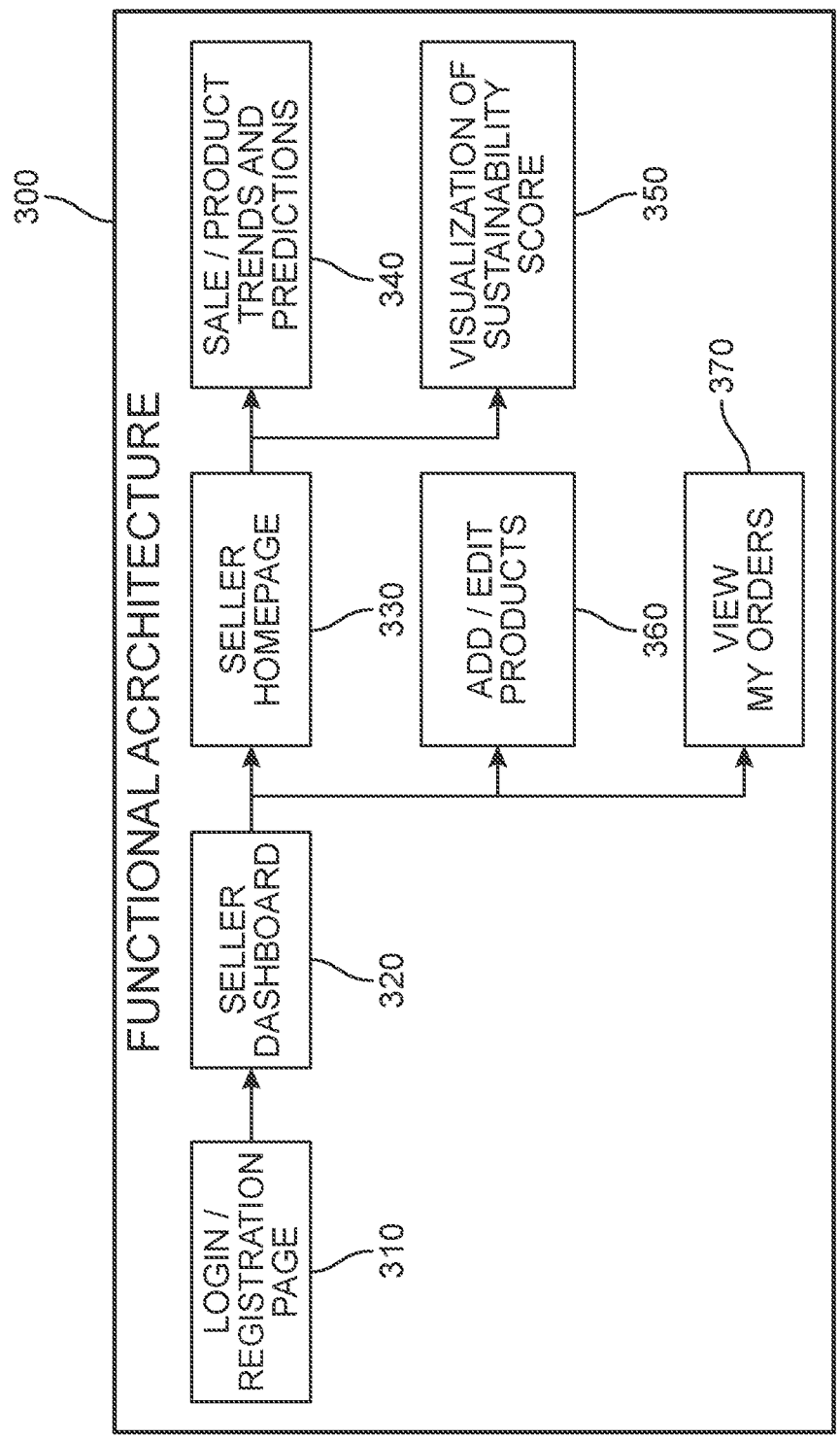
FIG. 3 is a schematic high-level flow diagram depicting an embodiment of a seller interaction process.

Referring now to FIGS. 2 and 3, two flow diagrams illustrating the functional flow of the architecture of an embodiment of the proposed systems is depicted. In general, applications of the system are built and deployed by a software framework. A software framework is a universal, reusable software environment that provides particular functionality as part of a larger software system to facilitate development of software applications. Software frameworks may include support programs, compilers, code libraries, tool sets, and application programming interfaces (APIs) that enable development of a software application. Some implementations can provide a user device and/or component management system that is capable of facilitating the development of software applications through the use of a user interface designed to be simple to use, and re-usable software components (e.g., buttons, links, fields, graphics, and/or the like) that can be displayed in the user interface and generated in multiple different software frameworks and/or programming languages for a variety of systems. For example, the component management system may provide a first software application that includes a user interface through which a user can develop a second software application. The user may use features of the user interface to create software components that are displayed in the first software application (e.g., the UI) using a first programming language (e.g., hypertext markup language (HTML) or another programming language associated with the first software application) and generated in a first software framework (e.g., a software framework associated with the software application being developed). The user interface may include features, such as drag and drop operations for the creation of software components and selectable software component characteristics, to facilitate creation and customization of software components. In some implementations, the component management system may store components that were previously generated by users, generate copies of software components in multiple software frameworks and/or for different systems, and make software components available for users to include in software applications that are under development.

In this way, a user device and/or component management system may facilitate the development of software applications in multiple software frameworks and for multiple systems, without requiring special knowledge or repeated component development on the part of a user, and in a manner designed to be relatively quick and efficient. Special software framework knowledge and/or familiarity may not be required, for example, by using a user interface to enable the generation of software components in multiple software frameworks in a single integrated development environment (IDE), such as a web-based IDE that is accessible from any device with a web browsing application browser. Some non-limiting examples of such frameworks include Microsoft .NET™, the EMC™ IDE, the Microsoft™ Visual Studios IDE for writing and debugging code, and the Eclipse™ IDE for incorporation of open-source code. Reusable software components may significantly increase the speed and efficiency of software development, including facilitating more efficient use of software developer time and computing resources (e.g., processor resources, memory resources, and/or the like). Some implementations may reduce network communications relative to a purely cloud-based application development solution, e.g., by enabling the user device to perform much of the functionality for component and software application development without the need to interact with a server computer over a network, which would introduce latency into the development process. Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create multiple software components in multiple software frameworks.

In some embodiments, the software development application may be an application installed on and executed by the user device. In some implementations, the software development application may be a web-based application designed to execute a web application (e.g., an application operating on a server computer or the component management system, and implemented in HTML, JavaScript, and/or the like). The software development application may be written in a variety of programming languages and provide a variety of different types of user interface elements, which may be used in the development of a new software component and/or another software application. In some embodiments, the software development application includes a component toolbox. The component toolbox may be presented via a user interface offering one or more interactable user interface elements, such as buttons, which are associated with software components. For example, the component toolbox may include one or more buttons for the generation of software components, such as input components (e.g., buttons, checkboxes, dropdown lists, toggle buttons, text fields, and/or the like), navigational components (e.g., search fields, sliders, pagination indicators, links, icons, and/or the like), informational components (e.g., tooltips, progress bars, message boxes, images, and/or the like), and/or the like. In some implementations, the component toolbox may include user interface elements that generate a software component based on a pre-existing software component (e.g., a previously created software component). In some implementations, the component toolbox may include a user interface element designed to enable the creation of a new software component, which may enable a user of the user device to define a new type of software component.

In different embodiments, the system can also rely on customized APIs developed and/or supported by the software development framework to generate interactive visualization dashboards. For purposes of this disclosure, Application Programming Interfaces (APIs) may refer to computer code that supports application access to operating system functionality. A system dependent API may be understood to rely on the functionality of a particular software system. The system dependent API may use device specific libraries or native code allowing access to the mobile device at a low level. The API can be configured to provide a wide range of visualization dashboards for marketplace management.

In general, when a user accesses an application homepage for the system, they are able to select whether they are a new or existing user. If they are a new user, the system will request registration details in order to generate an account and profile/role for the user, such as user demographic data, personal information, age, education, income, location), and product attribution data related to the product itself. Over time, additional data such as user behavior data including user interaction and engagement data with the system may be collected to improve the performance of the system.

If they are an existing user, the system will request login credentials. Once they have successfully logged in, the system will navigate to either a buyer dashboard or a seller dashboard, based on their selected role (e.g., buyer or seller). In buyer diagram 200 of FIG. 2, following user interaction with either the login or registration page in a first stage 210, the system will present a buyer dashboard in a second stage 220. In different embodiments, the buyer dashboard is configured to offer one or more options for interacting with the marketplace and its database. For example, in some embodiments, the buyer dashboard provides a first option 230 for reviewing trends in the buyer's own industry or other industries, which can also offer knowledge regarding possible products that can be re-used via various processes, a second option 240 for exploring industries and/or products that are currently available, which can allow the user to see if their desired products can be procured at this time, a third option 250 for searching the product inventory, generating recommendations, and/or selecting and placing an order, and a fourth option 260 for tracking the status or details of their order. Recommendations will typically be based on parameters such as price, MoQ (minimum order quantity), company rating, distance, delivery time, etc., and/or products that are co-related or complement one another across the industry. Thus, the buyer dashboard is configured to provide and enable buyer access to information and inventory. In some embodiments, the information is based on the buyer's own existing processes, which can be used by the system to determine the buyer's capabilities for waste/byproduct transformation. Trends on industry specific re-usability and circular economy patterns for products which are re-used by other industries and vice-versa can influence the breadth of compounds that may be deemed desirable.

On the other side, FIG. 3 presents seller diagram 300. Following user interaction with either the login or registration page in a first stage 310, the system will present a seller dashboard in a second stage 320. In different embodiments, the seller dashboard is configured to offer one or more options for interacting with the marketplace and its database as well as the seller's own inventory of listed products. For example, in some embodiments, the seller dashboard provides a first option 330 for navigating to a homepage where their offerings are listed, a second option 360 to add or edit products that are listed in their offerings ("My Products"), and/or view the status and details of orders they have received and have fulfilled or are in the process of fulfilling ("My Orders"), and/or their communications with buyers. In some embodiments, the seller can also view product sale trends (e.g., top purchases, most sold items, trending, or most searched-for items, etc.) and intelligent predictions for the marketplace as well as their own sustainability score, their actual SDG score as compared to a target SDG score, which may be shown as a graph, chart, or via another visualization tool. In one embodiment, if a seller is not being identified by the system as a recommended seller, alerts may be presented to the seller identifying issues and/or steps for improvement.

Figure 4:
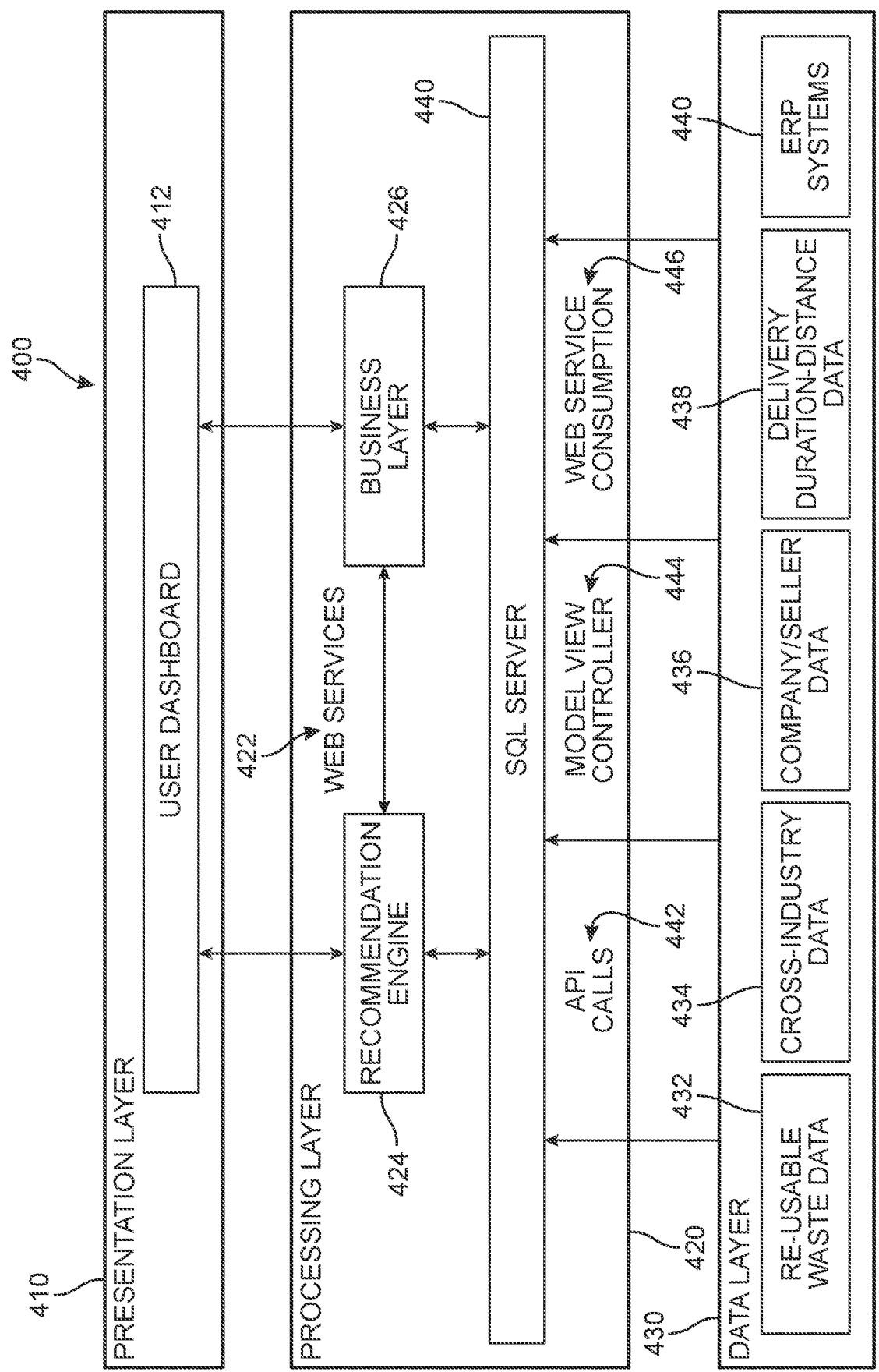
FIG. 4 is a schematic diagram of an embodiment of a technical architecture of the byproduct marketplace system.

FIG. 4 presents a schematic diagram of an embodiment of the technical architecture for the system environment 400. The environment 400 includes three layers, comprising a presentation layer 410, a processing layer 420, and a data layer 430. Along the back-end or data layer 430, a range of data types and sources is collected and managed, and supplied to the processing layer as required, including but not limited to re-usable waste data, cross-industry data, company (seller) data, delivery duration and distance data, and access to one or more Enterprise Resource Planning (ERP) systems. Data will be conveyed to/from the SQL server (e.g., Azure®) of processing layer 420 via API calls 442, Model View Controller 444 (e.g., Microsoft .NET MVC®), and Web Service Consumption 446. As users interact with a user dashboard 412 of the presentation layer 410 through web services 422, the SQL server can supply the necessary information to recommendation engine 424 (e.g., Python, Flask, etc.) and business layer 426 (e.g., Microsoft .NET MVC, C#, etc.). Although the drawings describe the database and/or server as SQL-based, it should be understood that any other database or server type may be used in the proposed embodiments, including but not limited to MySQL™, Oracle Database™, BM Db2™, PostgreSQL™, SAP HANA™ Amazon® Relational Database Service (RDS), Toad For Oracle™, SQLite™ etc.

In one embodiment, the recommendation engine applies Supervised Few-Shot Learning and can be understood to operate in three phases. In a first phase, the engine performs data mining of the buyer's profile to create a buyer-specific process dictionary for enabling customized and relevant recommendations. In a second phase, a list of companies which satisfy the sustainability goal index (measuring the responsibility of a certain company in social and environmental areas) is created. The classification of the target variable by the supervised recommendation system is performed based on sustainability score. The list of companies that satisfy all of the criteria (buyer preferences and sustainability standards) are generated and passed on to next phase for next step of recommendation. In the third phase, the system allows users to explore cross-industry usage of products as well as availability of the product (and the company offering the required product). In different embodiments, the recommendation system uses collaborative filtering and/or content-based filtering. Because the recommendation system would be assessing variables other than document text, a new scoring mechanism was developed which supports the stacked classifier for the recommendation system.

The scoring mechanism was developed by assigning different weightages and indices to the below parameters. Based on the score, a sustainability rating was assigned to the sellers and categorized based on classification threshold. These input parameters are passed to the recommendation model using a web service, and the recommendation model receives these inputs and returns a list of top companies which are best suited for the requirement of the buyer. When a buyer uses the portal to obtain suitable recommendations for their target reusable waste, they can enter certain parameters such as product, required quantity, and some other parameters that may have been provided during registration such as location of buyer, buyer industry, etc. Along with company recommendations from which the buyer could purchase the required product, the model also provides a recommendation of cross industry for better exposure and a diverse project portfolio.

In different embodiments, the scoring mechanism is based on a dataset comprising multiple parameters for recommendation related to reusables wastes and by-products such as: (1) Buyer Process Dictionary, (2) DataID, (3) Company, (4) Industry, (5) Product ID, (6) Product Name, (7) Minimum Order Quantity, (8) Total Quantity, (9) Also Used In, (10) Price Per Tonne, (11) Share Price, (12) Product Rating, (13) Company Rating, (14) Number Users Rated, (15) Energy Usage, (16) Carbon Intensity, (17) GHG Emission, (18) Certification Score, (19) Plant Location, (20) Recyclable Route Details, and (21) Tradeable chemical applications. Once a list is generated, the output will include identification of several parameters about the searched product such as Seller Name, Product Name, Cross Industry, Alternate Approach/Process, and Sustainability Index.

In addition, the model calculates (a) the weighted mean average of CompanyRating (the company rating, per objective parameters and/or customer feedback) and the NoUsersRated (number of users who rated the company) columns ("Result1") and (b) the weighted mean average of PricePerTonne (the cost per ton of the compound) and ProductRating (the quality of the product) columns ("Result2"). The model then calculates the average of Result1 and Result2 in order to identify a recommendation. In some embodiments, company rating can be based on one or more of explicit ratings (provided by users directly) and implicit ratings (provided by users indirectly as interaction behavior such as clicks, views, purchases).

In general, the recommendation engine bases its recommendation on a weighted mean average to calculate the classification threshold, as well as supervised few-shot learning which is a combination of stacked classifiers (e.g., random forest algorithm, KNN algorithm, logistics regression) and decision-making algorithms (e.g., decision tree, random forest). More specifically, in different embodiments, the recommendation model obtains company data from its database that is filtered based on the buyer's inputs. In some embodiments, aspects such as product similarity (related to items the customer has searched for previously) and user similarities to predict preferences can be used.

In different embodiments, the recommendation systems described herein may use a combination of recommendation techniques, including collaborative recommendation systems, which can be memory or model based, content-based recommendation systems, which may apply inverse document frequency (IDF), term frequency (TF), cosine similarity and nearest neighbors, matrix factorization, and vector space modeling.

In different embodiments, a visualization dashboard user interface ("dashboard") may be offered to the end-user with any variation in presentation style, options, menus, and graphical depictions, including interfaces customized by the end-user to display the desired information. A Settings option can also be displayed to allow the end-user to create or modify the account. In addition, a number of interface layer options may be provided. For example, a navigation menu can allow the user to switch to an Overview or landing page that presents a brief summary of the selected transaction session(s) along with tasks and alerts. For example, this page may include details such as the payment details, invoices received, etc. in some embodiments, an analytics overview or a metrics summary may be provided to display various factors used to determine whether the seller is eligible to sell on the system. Such metrics and reports can present big-picture views of data such as waste product sources (e.g., by supplier, industry, date, etc.), volume, number of invoices processed by industry, and other pertinent key performance indicators (KPIs) for payment management, such as those invoices that are "In Process", "Processed", the number of "Pending" and the releases that were "Returned". All of these numbers are updated in real time via databases, RPAs, and artificial intelligence. In some embodiments, some or all of these reports can be presented in graphical form, such as bar graphs, line graphs, pie charts, cartesian graphs, percent complete indicators, etc. This dashboard may represent the front-end access to the system.

Figure 5:
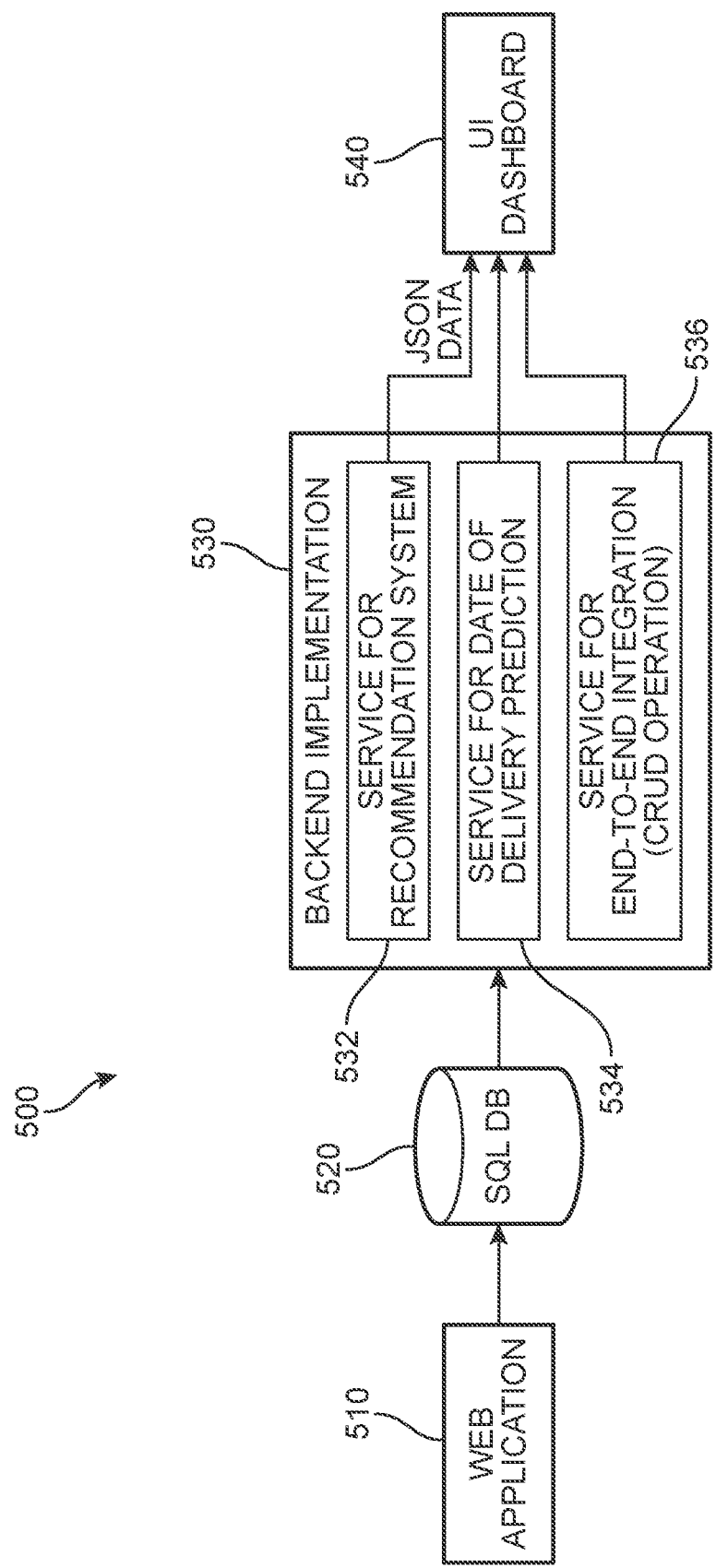
FIG. 5 is a schematic flow diagram of a process for delivering services through the byproduct marketplace system, according to an embodiment.

Additional details regarding the components of FIG. 4 are now discussed with reference to flow diagram 500 of FIG. 5. In a first step, a web application 510 for the system communicates with SQL database 520. The SQL database 520 communicates with components enabling back-end implementation module 530 of the various services provided through the system, including service for the recommendation system 532, service for the data of delivery prediction 534, and service for end-to-end integration (CRUD operation) 536. The services generate data (e.g., in JSON format) that is presented to the user via User Interface (UI) dashboard 540. Thus, there are multiple APIs that are designed to (a) recommend companies and products relevant to a search, typically based on the FLASK service reading data from SQL database 530; (b) generate delivery date predictions; and (c) perform different operations selected by the user. In some embodiments, the server uses a Pyodbc or other open-source module for accessing databases in which the "Supervised Few-Shot Learning" recommendation system is used to recommend companies, products and processes.

For purposes of this disclosure, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In different embodiments, the SQL database 520 is configured to work with the back-end implementation module 530 to calculate prediction values. For example, the Python FLASK service can make use of Pandas (library) modules to perform calculations for recommending companies on the data collected from the user. As a general matter, some features that may be identified during the recommendation phase by the system to classify sellers as potential candidates for buyers can include energy usage, certification score, carbon intensity, GHG emission, and other such parameters by which a company may be evaluated for their green operations, which are used to calculate the SGI and green score (GS). In one embodiment, for each seller, the system calculates values using the formula. Where E1=EnergyUsage, E2=GHGEmission, Cert=CertificationScore, Carbon=CarbonIntensity, C1=Energy.mean( ) C2=Emission.mean( ) m1=Cert.quantile (0.70), m2=Carbon.quantile(0.70), Result1=((Cert*E1)+(C1*m1))/(E+m1), and Result2=((Carbon*E2)+(C2*m2))/(E2+m2), the formula is Prediction=(Result1+Result2)/2. For each item, a decision tree algorithm and/or KNN algorithm is used to determine if (prediction>Classification Threshold (CT)). If the prediction value is greater than the CT, it is labeled as 0; otherwise it is labeled as 1. In some embodiments, the outputs of the decision tree algorithm and/or KNN algorithm are provided to a logistics regression algorithm in order to finalize a recommendation list (in order of most optimal seller to least out of the set of qualifying candidates). Selected features with labeled data are then passed to the stack classifier for training.

In some embodiments, the recommendation system can further consider another set of features, including cost, distance, quantity, alternate process, and "also used in" (identifying related compounds that the product could be used to make) directed to more practical aspects of the sale before finalizing the list. In such cases, the order of most optimal to least optimal would be refined, being based not only on sustainability features, but on additional buyer preferences for the transaction. In a further embodiment, the recommendation system may also filter the results (the recommendation list) in order to only present the pairs of products and processes that are of relevance to the buyer.

In addition, in different embodiments, for maintaining end-to-end operations, for example along the business layer (see FIG. 4) the system will create and/or consume APIs to perform various tasks by the user, including but not limited to (1) login (string email, string password), (2) getProductsFromCart (int userID), (3) deleteFromCart (int cartID), (4) getMyOrder (int userID), (5) getOrderDetails (int orderID), (6) addToCart (int userID, string productName, string quantity, string price, string company), (7) saveOrder (int orderID, int userID, string estimatedDate), (8) getMyCartCount( ), (9) getProductsOnIndustry (string industryName), (10) getIndustryOnUserID (int userID), (11) saveUser( ), and (12) forgotPassword (string email).

Figure 6A:
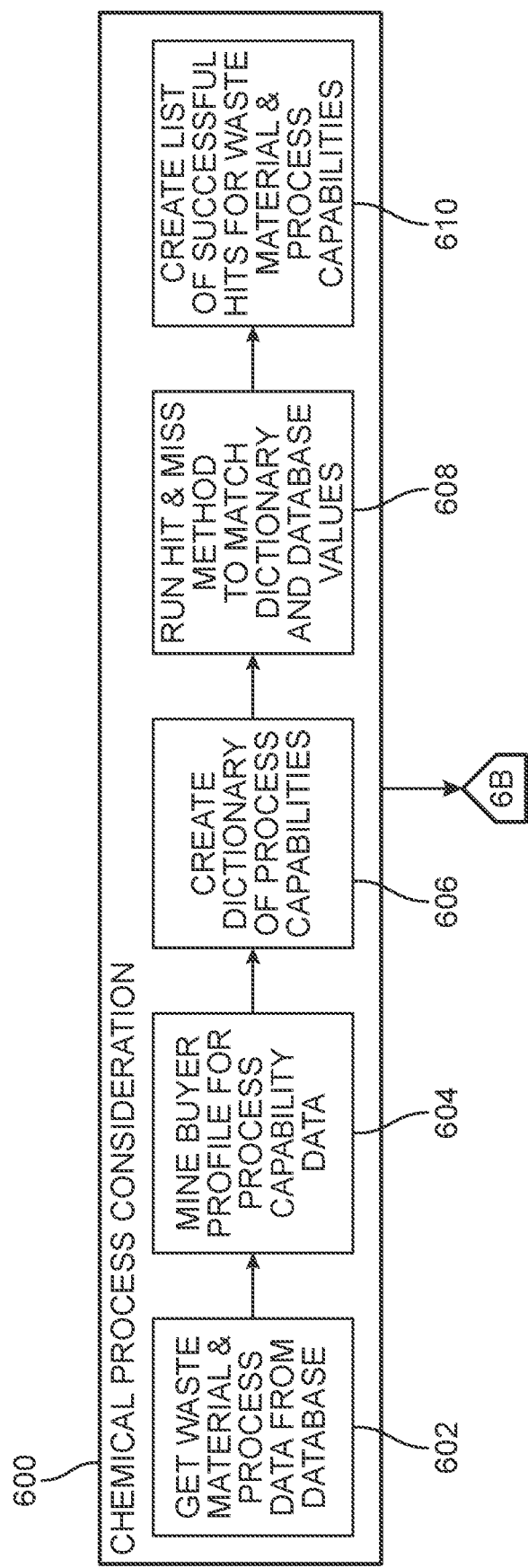
FIGS. 6A-6C collectively illustrate a schematic flow diagram of a machine learning process for building an algorithm to identify sellers in response to a buyer input, according to an embodiment.
Figure 6B:
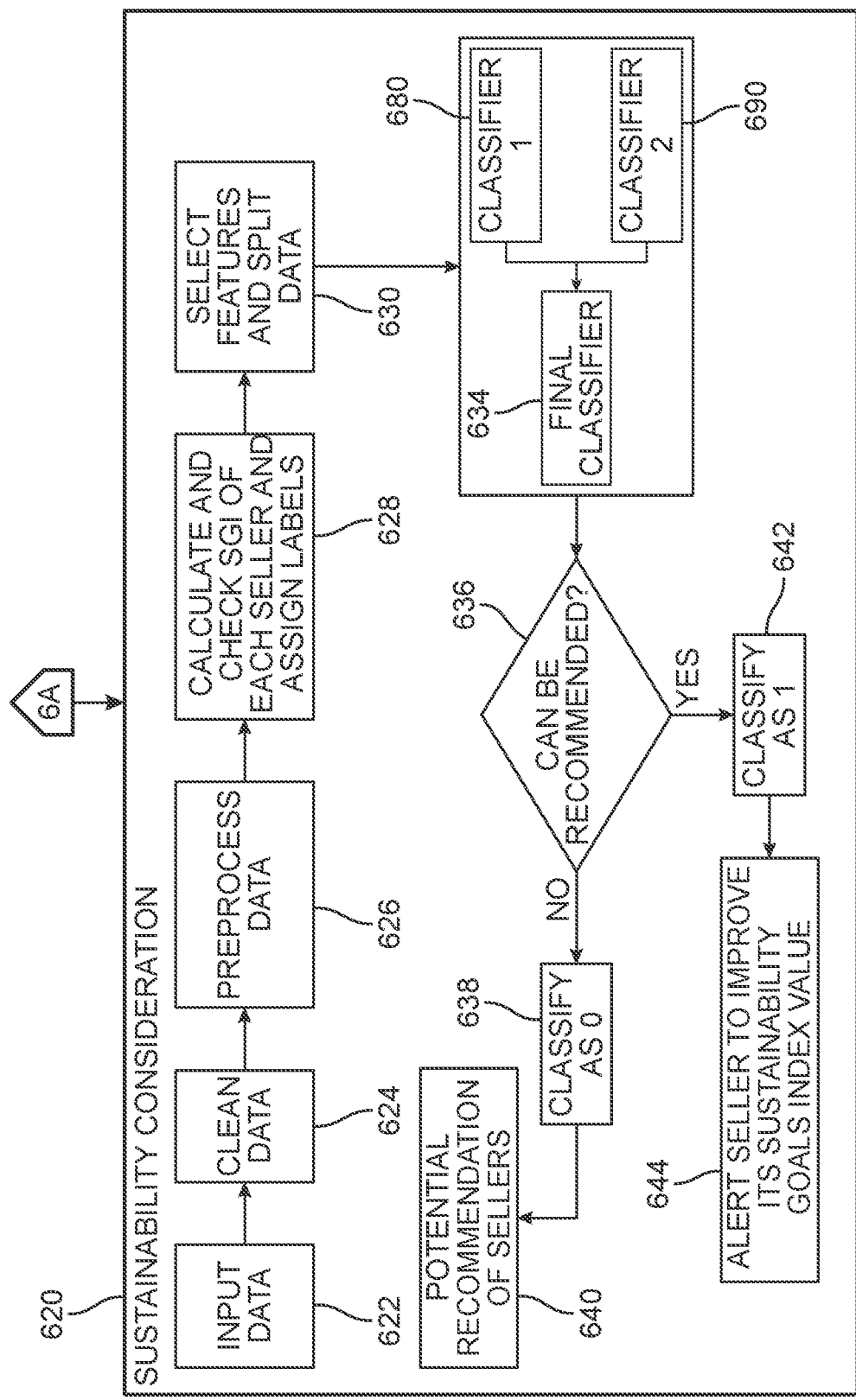
Figure 6C:
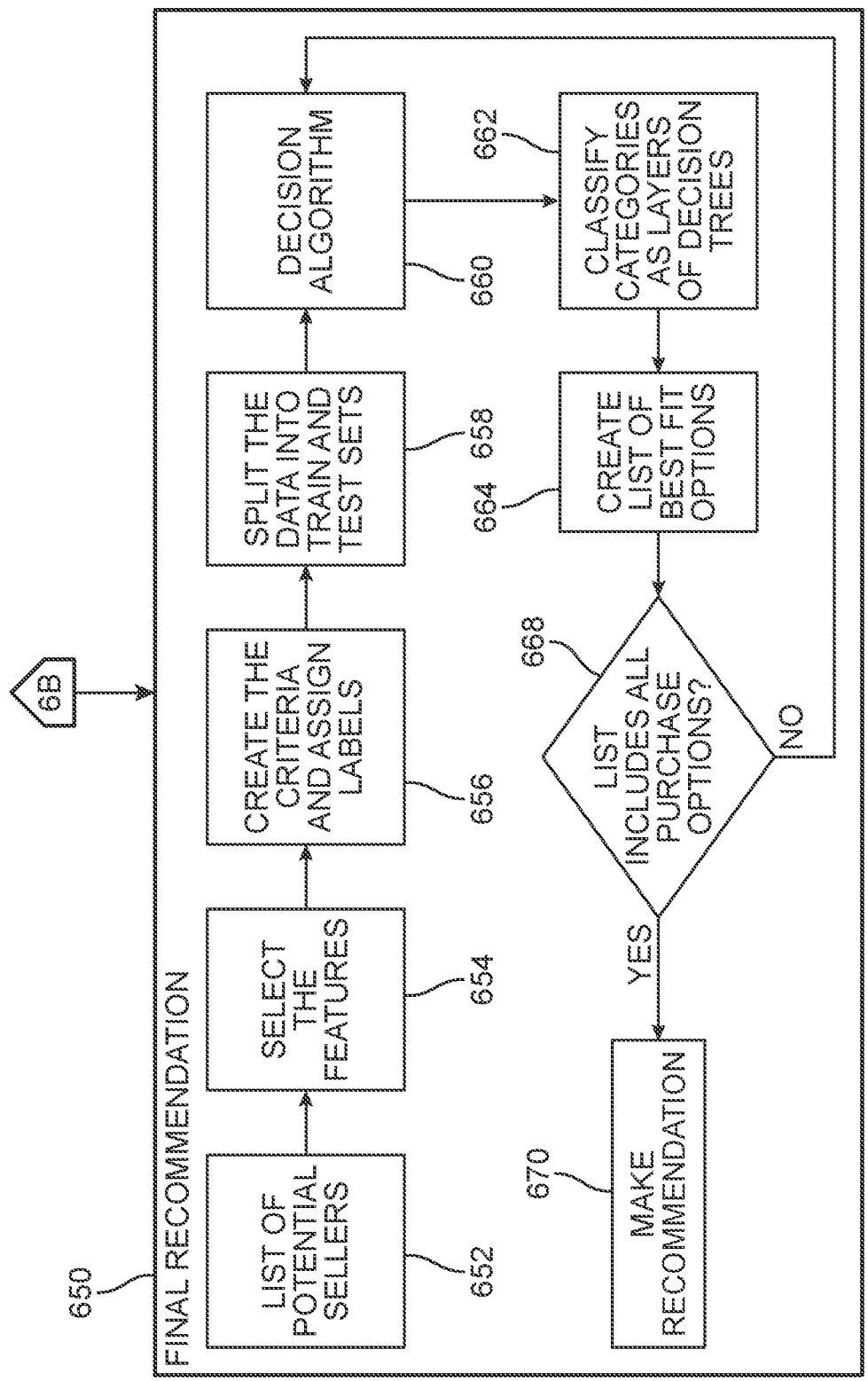

In different embodiments, machine learning models can be used to build the algorithm(s) that will predict values in response to user inputs. Referring to FIGS. 6A-6C, an interconnected flow diagram comprising a chemical process consideration module 600 (FIG. 6A), a sustainability consideration module 620 (FIG. 6B), and a final recommendation module 650 is presented. In FIG. 6A, the process begins with a first step 602 in which waste material(s) data are obtained and is processed. In a second step 604, the buyer profile is mined for process capability data (e.g., what processes do they have available for transforming compounds). In a third step 606, a dictionary of process capabilities for the buyer is created, and in a fourth step 608, a hit and miss method is executed to match the dictionary terms (processes) with current database values. A fifth step 610 includes generating a list of successful 'hits' positively corresponding to the desired waste material and available process capabilities.

Moving to FIG. 6B, the output of the chemical process consideration module 600 is shared in a sixth step 622 with sustainability consideration module 620 as input data, the data is cleaned in a seventh step 624 and preprocessed in an eighth step 626. The Sustainability Goals Index (SGI) for each seller is calculated and labels are assigned accordingly in a further step 628. Per the buyer's input, specific features are selected and the data is split in a ninth step 630 for use by a first classifier 680 and a second classifier 690 for classification by a final classifier 634. Based on the output of the final classifier 634, the system determines whether the seller product can be recommended in a tenth step 636. If yes, the classification is assigned a 0 value in an eleventh step 638 and a recommendation of potential sellers is generated in a twelfth step 640. If the system determines a recommendation may not be made, the classification is assigned a 1 value in a thirteenth step 642 and the seller is alerted to encourage the company to improve its SGI in a fourteenth step 644 in order to be eligible for recommendation status.

The output of the sustainability consideration module 620 comprising the list of potential sellers is then conveyed to the final recommendation module 650 of FIG. 6C in a fifteenth step 652. Features are selected in a sixteenth step 654, criteria are created and labels assigned in a seventeenth step 656, the data is split into training and test sets in an eighteenth step 658, and provided to a decision algorithm 660. The decision algorithm classifies the categories as layers of decision trees in a nineteenth step 662, and a list of best-fit options are created in a twentieth step 664. The system verifies whether the list includes all purchase options in a twenty-first step 668. If not, the process will return to the decision algorithm 660. If the list does include all purchase options, the system can make a recommendation to the buyer in a twenty-second step 670.

Figure 7:
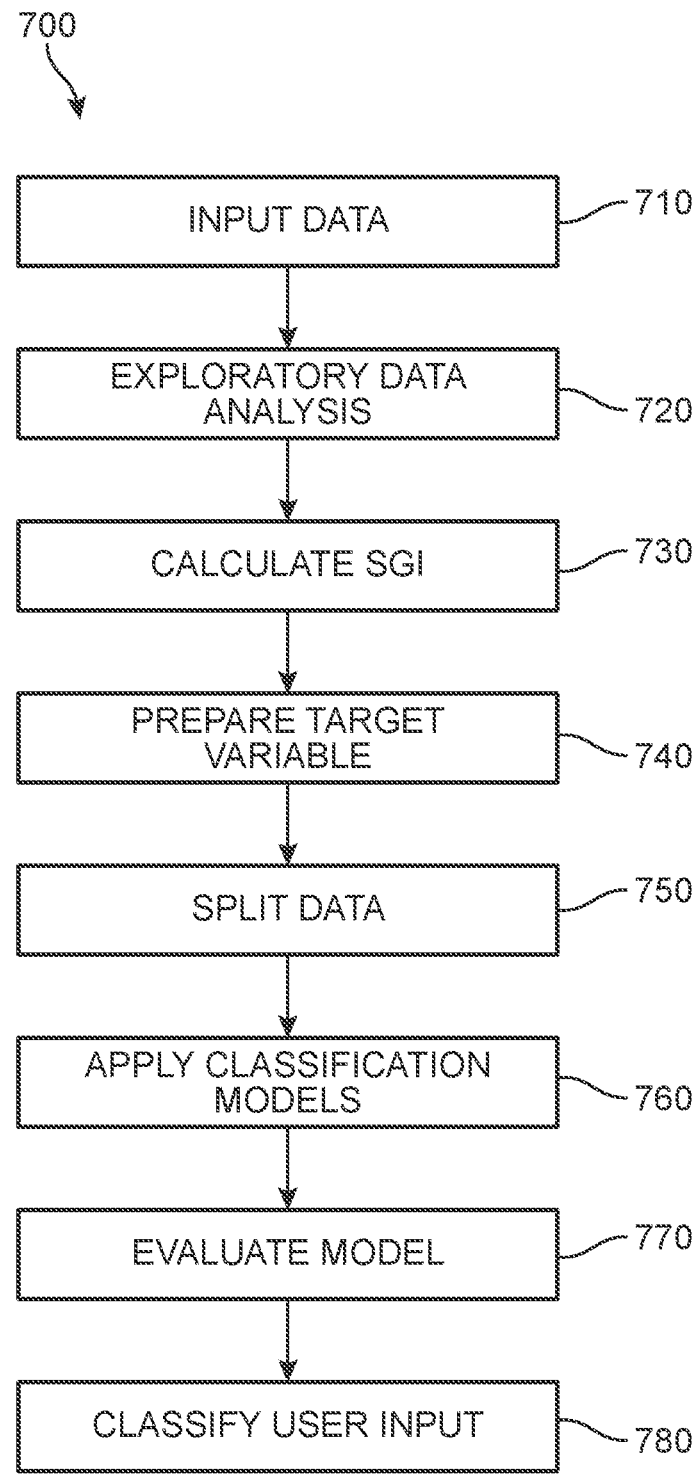
FIG. 7 is a flow chart presenting a process for building the supervised machine learning model used to predict the value(s) for user inputs based on the prior learning available data make recommendations, according to an embodiment.
Figure 8:
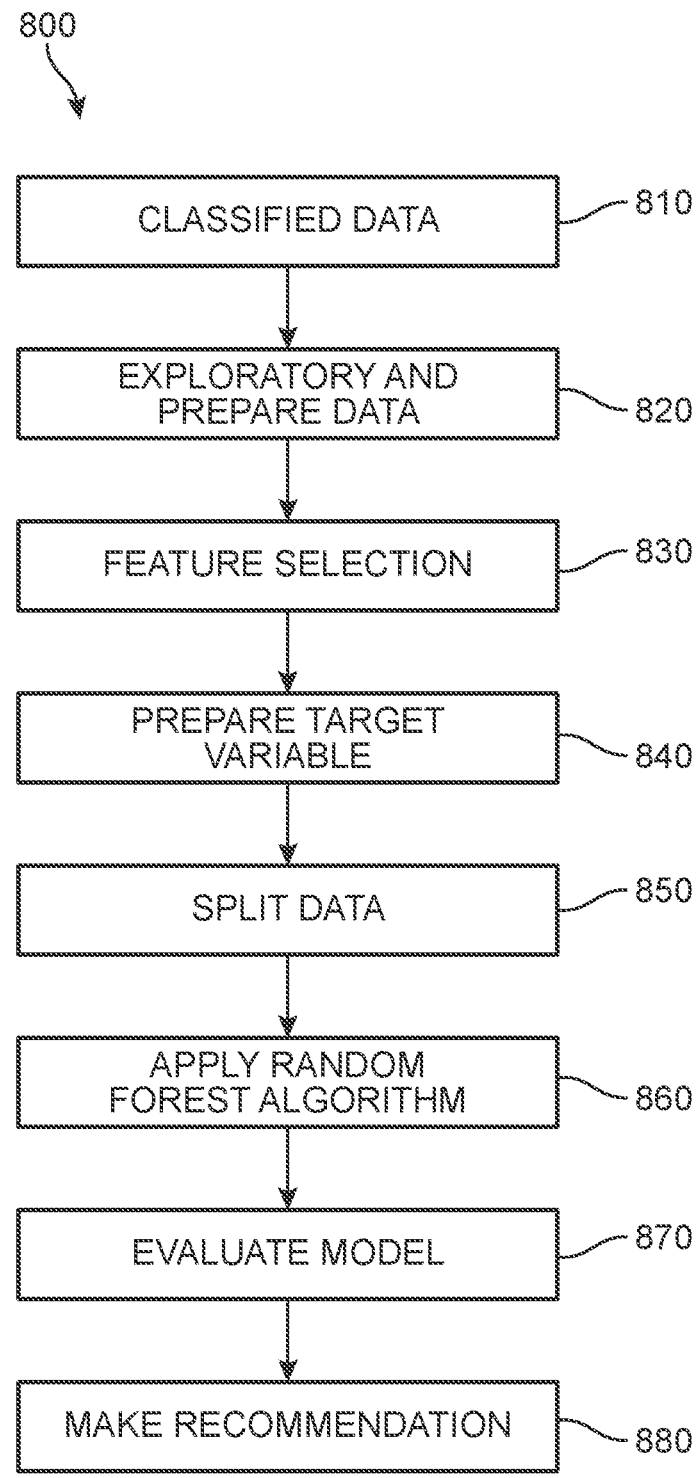
FIG. 8 is a flow chart presenting a process for building the supervised decision-making algorithm used to determine which recommendation scenario should be presented based on the selected feature values, according to an embodiment.

Additional details regarding the first classifier 680 and second classifier 690 (FIG. 6B) are now provided with reference to FIGS. 7 and 8. In FIG. 7, a first flow chart 700 presents a process for building the supervised machine learning model used to predict the value(s) for user inputs based on the prior learning available data. Data is input in a first step 710, where required data from different sources are gathered for the model to train for the prediction or best-fit identification of relevant sellers that satisfy the classifier threshold value. In a second step 720, exploratory data analysis is performed, including encoding, imputation, normalization, and other techniques for understanding and identifying data patterns in order to determine the best mechanism by which to utilize the data to meet the buyer's requirements. The SGI is calculated in a third step 730 applying a weighted mean average method for target variable classification and scoring. The target variable is prepared in a fourth step 740, where the classifier threshold value is established and data labeling for the supervised machine learning process occurs. In a fifth step 750, the data is split into a training dataset and a testing dataset, where the training dataset will be the basis for the learning of the algorithm and the testing dataset will be the reference data which will be used for the evaluation of the model. Classification models are applied in a sixth step 760, where the training dataset is passed to the model. In one embodiment, the data is passed to multiple models and the results combined for better performance. The model(s) will use the provided pattern as basis of learning for the classification. In a seventh step 770 the classification model is evaluated by comparing with the prediction of testing dataset values, and using techniques such as confusion matrix, accuracy, cross-validation, root mean square method, and other evaluation techniques to determine the goodness-of-fit for the model. Finally, in an eighth step 780, the user input is classified. Thus, when the user provides input in form of search query, the trained model will use its training set-based learning and classify the user query before passing on the results for further filtration.

In FIG. 8, a second flow chart 800 presents a process for building the supervised decision-making algorithm used to determine which recommendation scenario should be presented based on the selected feature values. In a first step 810, classified data from the stack classifier is obtained representing the list of potential sellers that may be presented for recommendation (e.g., sellers who have satisfied classifier thresholds). The data is explored and prepared in a second step 820 by transforming the data into the required form via encoding, imputation, normalization, and other processing techniques. The system will also confirm the co-related features and explore the features further for best results. A third step 830 involves selecting only the most relevant features to optimize the algorithm performance and enable the features to be used efficiently. In some cases, filtering of less useful features can occur and/or transformation of features. In a fourth step 840, the classifier threshold value is set based on the feature values and requirements, and label(s) assigned to the data for later use. The data is split into a training dataset and testing dataset in a fifth step 850, where the training dataset will be the basis for the learning of the algorithm and the testing dataset will serve as reference data to be used for the evaluation of the model. In a sixth step 860, the training dataset is passed to the random forest algorithm which will create a decision tree based on waste material treatment or processes the material undergo, while ensuring sustainability and cost are factored as considerations. In a seventh step 870, the classification model is then evaluated by comparison with the prediction associated with testing dataset values and applying techniques such as confusion matrix, accuracy, cross-validation, root mean square method, and other evaluative techniques that assess the goodness-of-fit for the model. Finally, in an eighth step 880, when the user provides an input in the form of a search query, the trained model will use the training set-based learning and produce an optimal recommendation identifying one or more companies, products, and processes to the buyer.

In some embodiments, the machine learning models used to determine the seller's eligibility and/or buyer recommendations can include, but are not limited to, a Google™ API machine learning model, a Microsoft™ Azure API machine learning model, an IBM™ Bluemix API machine learning model, a classifier machine learning model, etc. In some embodiments, the system may perform a training operation on the machine learning model as discussed above. In some implementations, the system may train the machine learning model using, for example, an unsupervised training procedure and based on the training set. For example, the system may perform dimensionality reduction to reduce the data to a minimum feature set, thereby reducing resources (e.g., processing resources, memory resources, and/or the like) to train the machine learning model, and may apply a classification technique to the minimum feature set. Additionally, or alternatively, the system may use a support vector machine (SVM) classifier technique to generate a non-linear boundary between data points in the training set. In this case, the non-linear boundary is used to classify test data into a particular class.

Additionally, or alternatively, the system may train the machine learning model using a supervised training procedure that includes receiving input to the machine learning model from a subject matter expert or other operator, which may reduce an amount of time, an amount of processing resources, and/or the like to train the machine learning model of activity automatability relative to an unsupervised training procedure. In some embodiments, the system may use one or more other model training techniques, such as a neural network technique, a latent semantic indexing technique, and/or the like. For example, the system may perform an artificial neural network processing technique (e.g., using a two-layer feedforward neural network architecture, a three-layer feedforward neural network architecture, and/or the like) to perform pattern recognition with regard to patterns of whether a document includes a particular response type or input value. In this case, using the artificial neural network processing technique may improve an accuracy of the trained machine learning model generated by the system by being more robust to noisy, imprecise, or incomplete data, and by enabling the electronic document system to detect patterns and/or trends undetectable to human analysts or systems using less complex techniques. In some embodiments, the machine learning model may include a support vector machine model, a linear regression model, a logistic regression model, a naive Bayes model, a linear discriminant analysis model, a decision tree model, a k-nearest neighbor model, a neural network model, and/or the like.

In order to offer a further understanding of the proposed embodiments for the reader, some examples of waste material exchange are described below. For purposes of reference, some examples of common byproducts being used as raw material in plastics, polymers, and allied industries and can be traded and recycled via the proposed system can include Toluene (for Solvents, Artificial Sweetening, Paint Industries, Rubber Industries, Rubber Chemicals, Naphthalene (for Dye intermediates, Insecticides, Dispersing Agents, Tanning Agents, Beta Naphthol, Refined Naphthalene), Benzene (for raw material for various drugs, Dye-stuff, Synthetic Rubber, Styrene, Pesticides, Hard Pitch (for Carbon for electrodes in Aluminum industry, graphite manufacturing), Naphtha (for ink, solvents, thinner), and Anthracene oil (for Carbon black).

As a first example, a crude oil plant is designed to refine raw natural resources such as crude oil to obtain naphtha or gas/oil. Following a cracking process, a number of byproducts are obtained, including benzene, butadiene, propylene, xylene, and ethylene. These byproducts can be listed on the system by the company as an offering for buyers who have listed the cracking process in their dictionary. Alternatively, if the seller has a cracking process, they can offer the byproducts on the system by indicating they have a cracking process in place that can generate the desired byproduct for the buyer.

In a case where a buyer's target product is phenol, the system is configured by reference to its database to determine what compounds could be used to obtain phenol via one or more processes. The recommendation engine will identify which processes are available to the buyer to ensure the transformation to phenol can occur. For example, alkalization with propane can be used to convert benzene to cumene. Cumene in turn can be used to obtain phenol by either a Dow process or an air oxidation process (which would also generate acetone). In this scenario, the final recommendation made by the system would be based on the available process in the buyer's dictionary. In other words, if the buyer has listed only Dow Process in their dictionary as an existing process, sellers with phenol (directly) would be listed as a Level 1 recommendation, as well as a Level 2 recommendation identifying the crude oil plant seller, along with a message that the cumene may be transformed via the buyer's Dow Process to obtain phenol. Alternatively, if the buyer has listed air oxidation in their dictionary, sellers with phenol (directly) would be listed as a Level 1 recommendation, as well as the crude oil plant seller, along with a message that the cumene may be transformed via the buyer's air oxidation process to obtain phenol. In cases where both processes are available to the buyer, all three recommendations would be presented to the buyer.

Although chemical industries have been described herein primarily for use with the proposed systems, it should be understood that other industries may also benefit from the system. In one scenario, the system may provide an opportunity for the metal industry to exchange waste or other byproducts. For example, integrated steel plants to remove impurities via a sustainable and profitable mechanism. In general, coking coal is used to produce metallurgical coke which is required in blast furnace for iron making process. This metallurgical coke is produced by destructive distillation of coking coal carried out in Coke Oven batteries. In the process of making coke, coal gas/coke oven gas is produced which can be used as a fuel for heating purposes in Coke Oven batteries to make coke. However, the coal gas contains impurities like tar, pitch, naphthalene, wash oil, phenol, benzene, light oil, toluene, etc. which need to be removed before it can be used in coke oven batteries. These impurities are removed as byproducts inside the steel plant complex. It may be appreciated that these impurities are—from the perspective of the integrated steel plant—waste materials that cannot be simply discarded in the surroundings due to environmental concerns. However, by listing their waste materials on the proposed marketplace system, these impurities can be obtained by other companies that may have resources that allow them to further treat or process the waste and extract their own commercial value out of it. In such an exchange, the buyer may express their desired product properties such softening point, specific gravity, moisture, etc. in order to filter the results further via the recommendation engine. As a specific example, a buyer may indicate a target product of cyclohexane. In response, the system will determine that cyclohexane can be produced by hydrogenation processing of benzene. Thus, a recommendation may be generated whereby the consumer can purchase the benzene if they have listed hydrogenation in their dictionary, or if the seller has listed hydrogenation their dictionary and are able to produce the cyclohexane for the buyer.

Other materials which can commonly be reprocessed with value added services (by chemical and physical methods) include oils, solvents, electroplating wastes, lead-acid batteries, scrap metal, food processing waste, plastic waste and cardboard. Some wastes have a use without the need for reprocessing or refining, e.g., waste acids and alkalis. Furthermore, may multinational industries do not rely on virgin or raw materials (e.g., Plastic, Agro-industrial, Paper, metal (iron, copper etc.), oil and gas, chemicals etc.). Through the proposed system, these materials can be easily traded to companies who can use them as raw material or use a different process to create their desired product.

Figure 9:
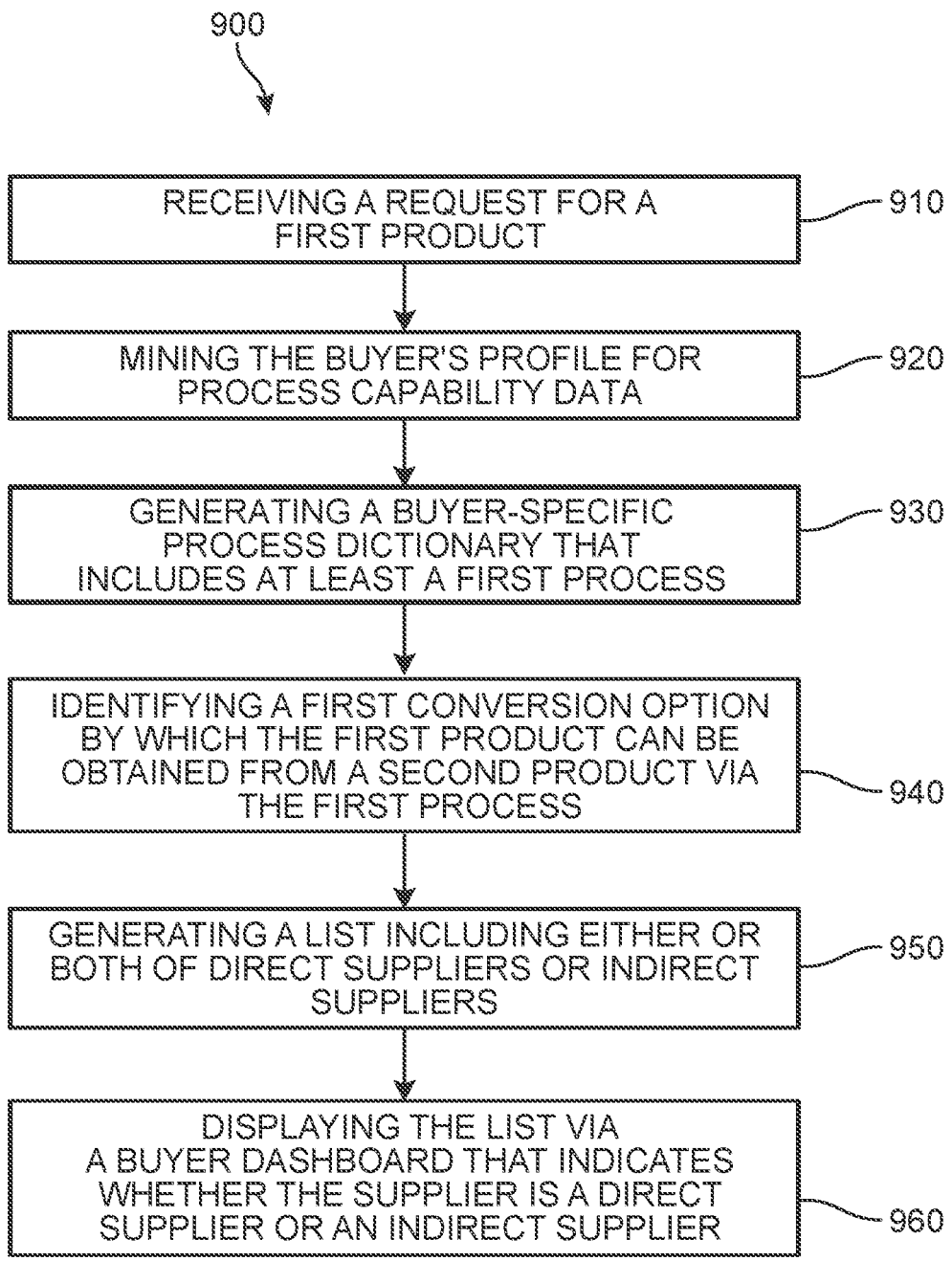
FIG. 9 is a flow chart depicting a method of identifying suppliers in a marketplace for the exchange of industrial byproducts, according to an embodiment.

FIG. 9 is a flow chart illustrating an embodiment of a method 900 of identifying suppliers in a marketplace for the exchange of industrial byproducts. The method includes a first step 910 of receiving, from a first consumer and at a cloud-based trading system, a (search) request for a first product, and a second step 920 of mining data from a profile of the first consumer in order to obtain process capability data for the first consumer. A third step 930 involves generating a process dictionary specific to the first customer based on the process capability data, the process dictionary including at least a first process, and a fourth step 940 includes automatically identify, at the trading system and with reference to the process dictionary, a first conversion option for the first product by which the first product can be obtained from a second product via the first process. The method 900 further includes a fifth step 950 of generating, via a recommendation engine of the trading system, a list including either or both of: direct suppliers offering the first product, or indirect suppliers offering the second product, and a sixth step 960 of displaying the list via a buyer dashboard for the trading system wherein the list indicates whether the supplier is a direct supplier or an indirect supplier, and the required process for converting the second product to the first product is indicated for indirect suppliers.

In other embodiments, the method may include additional steps or aspects. For example, the method can further include steps of receiving, from the first consumer and at the cloud-based trading system, one or more product fulfillment parameters, and filtering the list in order to include only those suppliers that match the first consumer's product fulfillment parameters. In some embodiments, the product fulfillment parameters include one or more of industry type, supplier company rating, location of supplier, distance to supplier, processes available to the supplier, processes available to the consumer, cost per ton, minimum order quantity limit, and types of waste. In one example, the process dictionary includes conversion processes available to either or both of the consumer and suppliers.

In one embodiment, the method may also involve steps of receiving, from a first supplier and at the trading system, a first registration profile, determining, at the trading system, a sustainability score for the first supplier, the sustainability score being based in part on a record of the first supplier in meeting one or more sustainability parameters, determining, at the trading system, that the sustainability score is below a minimum score threshold for the marketplace, and causing, at the trading system, the first supplier to be excluded from the list. In some embodiments, the sustainability parameters include one or more of energy usage, carbon intensity, greenhouse gas emissions, and green practice certifications. In one example, the method further includes displaying, at a seller dashboard of the trading system for the first supplier, an alert describing the exclusion and one or more recommendations for improving the sustainability score, and/or purchase trends associated with the first product.

In some cases, the method may further include a step of presenting one or more industry-specific trends related to re-usability of byproducts in order to promote a circular economy. In another embodiment, the method also includes steps of receiving, from the first consumer and by the trading system, a first order for a first amount of the first product from a first supplier identified on the list, displaying, at a seller dashboard of the trading system for the first supplier, a message indicating a confirmation of the first order, and automatically modifying, at the trading system, a quantity of the first product available from the first supplier to reflect the purchase of the first amount by the first consumer.

As described herein, the proposed system offers industries an opportunity to explore untapped value that can be generated from re-usable and recyclable waste. The system also provides an opportunity for cross-industry trading of waste products that can find application in different industries. Such a service will drive waste management practices towards circularity in contrast to the current linear process for waste handling and disposal. This promotes alignment with UN SDG goals, improvements in ESG (Environmental, Social and Governance) scores in waste management practices, and reduced procurement cost and reduced waste generation. In addition, the system offers an opportunity to review industry best practices and performances in waste management and/or form partnerships with cross industry entities engaged in waste trading practices.

It should be understood that the systems and/or methods as described herein may be implemented using different computing systems, components, modules, and connections. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service system. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system that supports execution of a complete operating system ("OS"). A process virtual machine may execute a single program and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating system to the guest operating systems and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A computer-implemented method for applying machine learning to identify latent features of suppliers for an exchange of industrial by-products, the method comprising:
   receiving, at a recommendation system, a dataset including, for multiple suppliers, their energy usage, carbon intensity, green practice certification, greenhouse gas emission, available manufacturing process capabilities, and available chemical compounds;
   receiving, at the recommendation system, labeled data that includes data patterns representing correspondences between a desired chemical compound and manufacturing process capabilities that can be used to convert other chemical compounds to the desired chemical compound;
   training a recommendation machine learning (ML) model for the recommendation system on the data patterns using a random-forest algorithm to determine a recommendation to present to a user in response to a set of feature values selected by the user, wherein the recommendation includes a transaction that has minimum energy emissions based on a distance between a supplier and the user;
   receiving, from a first user and at the trained recommendation ML model, a set of feature values including a first chemical compound and manufacturing process capabilities available to the first user;
   generating, via the trained recommendation ML model, a matrix identifying one or more potential suppliers, available chemical compounds that can be converted to the first chemical compound, and manufacturing process capabilities available to each of the potential suppliers, or to the first user, that can be used to convert each of the available chemical compounds to the first chemical compound;
   calculating, for each of the one or more suppliers, a sustainability score based on the supplier's energy usage, carbon intensity, and greenhouse gas emission;
   determining, via a decision tree algorithm of the trained recommendation ML model, whether the sustainability score for each supplier is greater than a selected classification threshold;
   filtering the matrix to exclude suppliers whose sustainability score is below the classification threshold; and
   presenting on a computing device, via a user interface of the recommendation system and based only on the suppliers included in the filtered matrix, a recommendation to the first user including either or both of:
   direct suppliers offering the first chemical compound, or
   indirect suppliers offering another chemical compound that can be converted to the first chemical compound via manufacturing process capabilities available to the indirect supplier and/or the first user.

2. The method of claim 1, further comprising:
   receiving, from the first user and at the recommendation system, one or more product fulfillment parameters as part of the set of feature values; and
   further filtering, via the recommendation system, the matrix to include only suppliers that match the first user's product fulfillment parameters.

3. The method of claim 2, wherein the product fulfillment parameters include one or more of industry type, supplier company rating, location of supplier, distance from the first user to supplier, manufacturing processes available to the supplier, cost per tonne, minimum order quantity, and types of waste.

4. The method of claim 1, wherein the sustainability score for a supplier is calculated using a first calculation based on the supplier's green practice certification and energy usage, and a second calculation based on the supplier's carbon intensity and greenhouse gas emission.

5. The method of claim 1, wherein the one or more suppliers include a first supplier, and the method further comprises:
calculating, at the recommendation system, a first sustainability score for the first supplier;
determining, at the recommendation system, that the first sustainability score is below the selected classification threshold; and
excluding, at the recommendation system, the first supplier from the recommendation.

6. The method of claim 5, further comprising displaying, at a supplier dashboard of the recommendation system for the first supplier, an alert showing the first sustainability score compared to a target sustainability score.

7. The method of claim 5, further comprising displaying, at a supplier dashboard of the recommendation system for the first supplier, an alert describing the exclusion, and one or more recommendations for improving their sustainability score.

8. The method of claim 1, further comprising presenting in the recommendation, one or more industry-specific trends related to re-usability of by-products in order to promote a circular economy.

9. The method of claim 1, wherein the recommendation includes information about each supplier's sustainability.

10. A non-transitory computer-readable medium storing software comprising instructions executable by one or more computers which, upon such execution, cause the one or more computers to apply machine learning to identify latent features of suppliers for an exchange of industrial by-products by performing the following:
receive, at a recommendation system, a dataset including, for multiple suppliers, their energy usage, carbon intensity, green practice certification, greenhouse gas emission, available manufacturing process capabilities, and available chemical compounds;
receive, at the recommendation system, labeled data that includes data patterns representing correspondences between a desired chemical compound and manufacturing process capabilities that can be used to convert other chemical compounds to the desired chemical compound;
train a recommendation machine learning (ML) model for the recommendation system on the data patterns using a random-forest algorithm to determine a recommendation to present to a user in response to a set of feature values selected by the user, wherein the recommendation includes a transaction that has minimum energy emissions based on a distance between a supplier and the user;
receive, from a first user and at the trained recommendation ML model, a set of feature values including a first chemical compound and manufacturing process capabilities available to the first user;
generate, via the trained recommendation ML model, a matrix identifying one or more potential suppliers, available chemical compounds that can be converted to the first chemical compound, and manufacturing process capabilities available to each of the potential suppliers, or to the first user, that can be used to convert each of the available chemical compounds to the first chemical compound;
calculate, for each of the one or more suppliers, a sustainability score based on the supplier's energy usage, carbon intensity, and greenhouse gas emission;
determine, via a decision tree algorithm of the trained recommendation ML model, whether the sustainability score for each supplier is greater than a selected classification threshold;
filter the matrix to exclude suppliers whose sustainability score is below the classification threshold; and
present on a computing device, via a user interface of the recommendation system and based only on the suppliers included in the filtered matrix, a recommendation to the first user including either or both of:
direct suppliers offering the first chemical compound, or
indirect suppliers offering another chemical compound that can be converted to the first chemical compound via manufacturing process capabilities available to the indirect supplier and/or the first user.

11. The non-transitory computer-readable medium storing software of claim 10, wherein the instructions further cause the one or more computers to:
receive, from the first user and at the recommendation system, one or more product fulfillment parameters as part of the set of feature values; and
further filter, via the recommendation system, the matrix to include only suppliers that match the first user's product fulfillment parameters.

12. The non-transitory computer-readable medium storing software of claim 11, wherein the product fulfillment parameters include one or more of industry type, supplier company rating, location of supplier, distance from the first user to supplier, manufacturing processes available to the supplier, cost per tonne, minimum order quantity, and types of waste.

13. The non-transitory computer-readable medium storing software of claim 10, wherein the sustainability score for a supplier is calculated using a first calculation based on the supplier's green practice certification and energy usage, and a second calculation based on the supplier's carbon intensity and greenhouse gas emission.

14. The non-transitory computer-readable medium storing software of claim 10, wherein the one or more suppliers include a first supplier, and the instructions further cause the one or more computers to:
calculate, at the recommendation system, a first sustainability score for the first supplier;
determine, at the recommendation system, that the first sustainability score is below the selected classification threshold; and
exclude, at the recommendation system, the first supplier from the recommendation.

15. The non-transitory computer-readable medium storing software of claim 14, wherein the instructions further cause the one or more computers to display, at a supplier dashboard of the recommendation system for the first supplier, an alert showing the first sustainability score compared to a target sustainability score.

16. A system for applying machine learning to identify latent features of suppliers for an exchange of industrial by-products, the system comprising one or more computers and one or more storage devices storing instructions that are operable, when executed by the one or more computers, to cause the one or more computers to:

receive, at a recommendation system, a dataset including, for multiple suppliers, their energy usage, carbon intensity, green practice certification, greenhouse gas emission, available manufacturing process capabilities, and available chemical compounds;

receive, at the recommendation system, labeled data that includes data patterns representing correspondences between a desired chemical compound and manufacturing process capabilities that can be used to convert other chemical compounds to the desired chemical compound;

train a recommendation machine learning (ML) model for the recommendation system on the data patterns using a random-forest algorithm to determine a recommendation to present to a user in response to a set of feature values selected by the user, wherein the recommendation includes a transaction that has minimum energy emissions based on a distance between a supplier and the user;

receive, from a first user and at the trained recommendation ML model, a set of feature values including a first chemical compound and manufacturing process capabilities available to the first user;

generate, via the trained recommendation ML model, a matrix identifying one or more potential suppliers, available chemical compounds that can be converted to the first chemical compound, and manufacturing process capabilities available to each of the potential suppliers, or to the first user, that can be used to convert each of the available chemical compounds to the first chemical compound;

calculate, for each of the one or more suppliers, a sustainability score based on the supplier's energy usage, carbon intensity, and greenhouse gas emission;

determine, via a decision tree algorithm of the trained recommendation ML model, whether the sustainability score for each supplier is greater than a selected classification threshold;

filter the matrix to exclude suppliers whose sustainability score is below the classification threshold; and present on a computing device, via a user interface of the recommendation system and based only on the suppliers included in the filtered matrix, a recommendation to the first user including either or both of:
  direct suppliers offering the first chemical compound, or
  indirect suppliers offering another chemical compound that can be converted to the first chemical compound via manufacturing process capabilities available to the indirect supplier and/or the first user.

17. The system of claim 16, wherein the one or more suppliers include a first supplier, and the instructions further cause the one or more computers to:
  calculate, at the recommendation system, a first sustainability score for the first supplier;
  determine, at the recommendation system, that the first sustainability score is below the selected classification threshold; and
  exclude, at the recommendation system, the first supplier from the recommendation.

18. The system of claim 17, wherein the instructions further cause the one or more computers to display, at a supplier dashboard of the recommendation system for the first supplier, an alert showing the first sustainability score compared to a target sustainability score.

19. The system of claim 17, wherein the instructions further cause the one or more computers to display, at a supplier dashboard of the recommendation system for the first supplier, an alert describing the exclusion, and one or more recommendations for improving their sustainability score.

20. The system of claim 15, wherein the recommendation includes information about each supplier's sustainability.

* * * * *